(12) United States Patent
Vreeland et al.

(10) Patent No.: US 9,150,081 B2
(45) Date of Patent: Oct. 6, 2015

(54) EVAPORATOR PHASE CHANGE THERMAL SIPHON

(75) Inventors: Gary Scott Vreeland, Medina, NY (US); Edward Wolfe, IV, E. Amherst, NY (US); Scott B. Lipa, Snyder, NY (US); Prasad S. Kadle, Williamsville, NY (US)

(73) Assignee: Delphi Technologies, Inc., Troy, MI (US)

( * ) Notice: Subject to any disclaimer, the term of this patent is extended or adjusted under 35 U.S.C. 154(b) by 608 days.

(21) Appl. No.: 13/451,665

(22) Filed: Apr. 20, 2012

(65) Prior Publication Data

US 2012/0272679 A1 Nov. 1, 2012

Related U.S. Application Data

(63) Continuation-in-part of application No. 12/481,933, filed on Jun. 10, 2009, now Pat. No. 8,397,529.

(51) Int. Cl.
| | |
|---|---|
| F25B 39/02 | (2006.01) |
| B60H 1/00 | (2006.01) |
| F28D 1/03 | (2006.01) |
| F28D 20/02 | (2006.01) |
| F28F 21/08 | (2006.01) |
| F28D 20/00 | (2006.01) |
| F28D 21/00 | (2006.01) |

(52) U.S. Cl.
CPC .............. *B60H 1/005* (2013.01); *F25B 39/022* (2013.01); *F28D 1/0341* (2013.01); *F28D 20/02* (2013.01); *F28F 21/08* (2013.01); *F25B 2400/24* (2013.01); *F28D 2020/0013* (2013.01); *F28D 2021/0085* (2013.01); *Y02E 60/145* (2013.01)

(58) Field of Classification Search
CPC ......... F25B 39/02; F25B 39/022; F25D 16/00
USPC ................. 62/244, 325.1, 434, 498, 515, 524
See application file for complete search history.

(56) References Cited

U.S. PATENT DOCUMENTS

| | | | | |
|---|---|---|---|---|
| 4,735,064 | A * | 4/1988 | Fischer | 62/430 |
| 5,111,878 | A * | 5/1992 | Kadle | 165/176 |
| 5,431,217 | A * | 7/1995 | Kadle et al. | 165/153 |
| 6,101,830 | A * | 8/2000 | Feuerecker | 62/304 |
| 7,156,156 | B2 | 1/2007 | Haller et al. | |
| 8,397,529 | B2 * | 3/2013 | Wolfe et al. | 62/244 |
| 2010/0313587 | A1 * | 12/2010 | Wolfe et al. | 62/244 |

* cited by examiner

*Primary Examiner* — Melvin Jones
(74) *Attorney, Agent, or Firm* — Brinks Gilson & Lione (57) ABSTRACT

An evaporator having a manifold and a plurality of refrigerant tubes extending downward in the direction of gravity from the manifold. The evaporator includes at least one PCM housing engaging the upper portion of the refrigerant tube for storing a phase change material. When operating in a first operating mode, heat is transferred from the phase change material to the refrigerant to freeze and cool the phase change material. When operating in a second operating mode, heat is transferred from the refrigerant to the frozen phase change material to condense the refrigerant. The condensed refrigerant falls downwardly through the tubes and receives heat from a flow of air to cool the air and evaporate the refrigerant. The evaporated refrigerant rises upwardly back to the low pressure of the cold manifold.

13 Claims, 8 Drawing Sheets

EVAPORATOR PHASE CHANGE THERMAL SIPHON

CROSS REFERENCE TO RELATED APPLICATION

This application is a continuation-in-part of U.S. patent application Ser. No. 12/481,933, filed on 10 Jun. 2009, the disclosure of which is incorporated herein by reference.

BACKGROUND OF THE INVENTION

1. Field of the Invention

An air conditioning system for cooling the cabin of a vehicle.

2. Description of the Prior Art

Fuel efficiency in vehicles is enhanced by shutting off the gasoline engine during inefficient periods, such as when the vehicle is coasting or temporarily stopped. However, the compressor of a traditional air conditioning system runs off the crankshaft of the gasoline engine, and therefore, the gasoline engine continues to operate during those inefficient periods to prevent uncomfortable conditions for the passengers of the vehicle. It is desirable to have an air conditioning system that continues to operate when the engine is shut off, so that vehicles may shut off their gasoline engine during those inefficient periods.

U.S. Pat. No. 7,156,156, issued to Haller et al. on Jan. 2, 2007 (hereinafter referred to as Haller '156), provides one solution to the problem of the air conditioning system not functioning when the engine is not running. The Haller '156 patent shows an evaporator having a refrigerant flowing there-through for transferring heat from a flow of air to the refrigerant in a first operating mode with the engine of the vehicle running. The evaporator includes a manifold extending in a horizontal direction. At least one tube is in fluid communication with manifold and extends downward in a vertical direction away from the manifold. The evaporator defines at least one cavity, or phase change material (PCM) tank, for storing a phase change material to transfer heat from the phase change material to the refrigerant to cool and freeze the phase change material in the first operating mode with the engine of the vehicle running.

The cavities of the Haller '156 patent are disposed adjacent to and engaging the plurality of tubes. In a second operating mode with the engine of the vehicle dormant, heat is transferred directly from the flow of air to the phase change material in the cavities to cool the flow of air and to melt or warm the phase change material. There remains a continuing need for improved air conditioning systems that continue to operate during inefficient periods when the engine of the vehicle is shut off.

SUMMARY OF THE INVENTION

The invention provides for an evaporator having a PCM housing engaging the upper region of the refrigerant tubes of the evaporator. In the second operating mode, heat is transferred from the refrigerant to the frozen phase change material to cool and condense the refrigerant. The refrigerant falls downward in the vertical direction through the tube. The condensed refrigerant then receives heat from the flow of air to cool the flow of air and to warm and evaporate the refrigerant. The evaporated refrigerant rises upwardly in the vertical direction back to the low pressure of the cold manifold where it dispenses heat to the frozen phase change material.

The evaporator for an air conditioning system provides for an improved passive system for cooling the cabin of a vehicle, both when the engine is running and dormant. It can also be used in a non-vehicular application. It is less voluminous, cheaper and easier to manufacture than the air conditioning systems of the prior art that continue to operate when the engine of the vehicle is dormant. Additionally, because the PCM housing engages the upper region of the refrigerant tubes, in which the lower temperature phase change material induces a thermal siphon of the refrigerant contained in the refrigerant tubes to continue cooling an on-coming air stream during brief periods where the engine of the vehicle is dormant. Lastly, it can be integrated into a pre-existing evaporator by engaging a PCM housing between adjacent refrigerant tubes.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE EXEMPLARY EMBODIMENT

Figure 3:
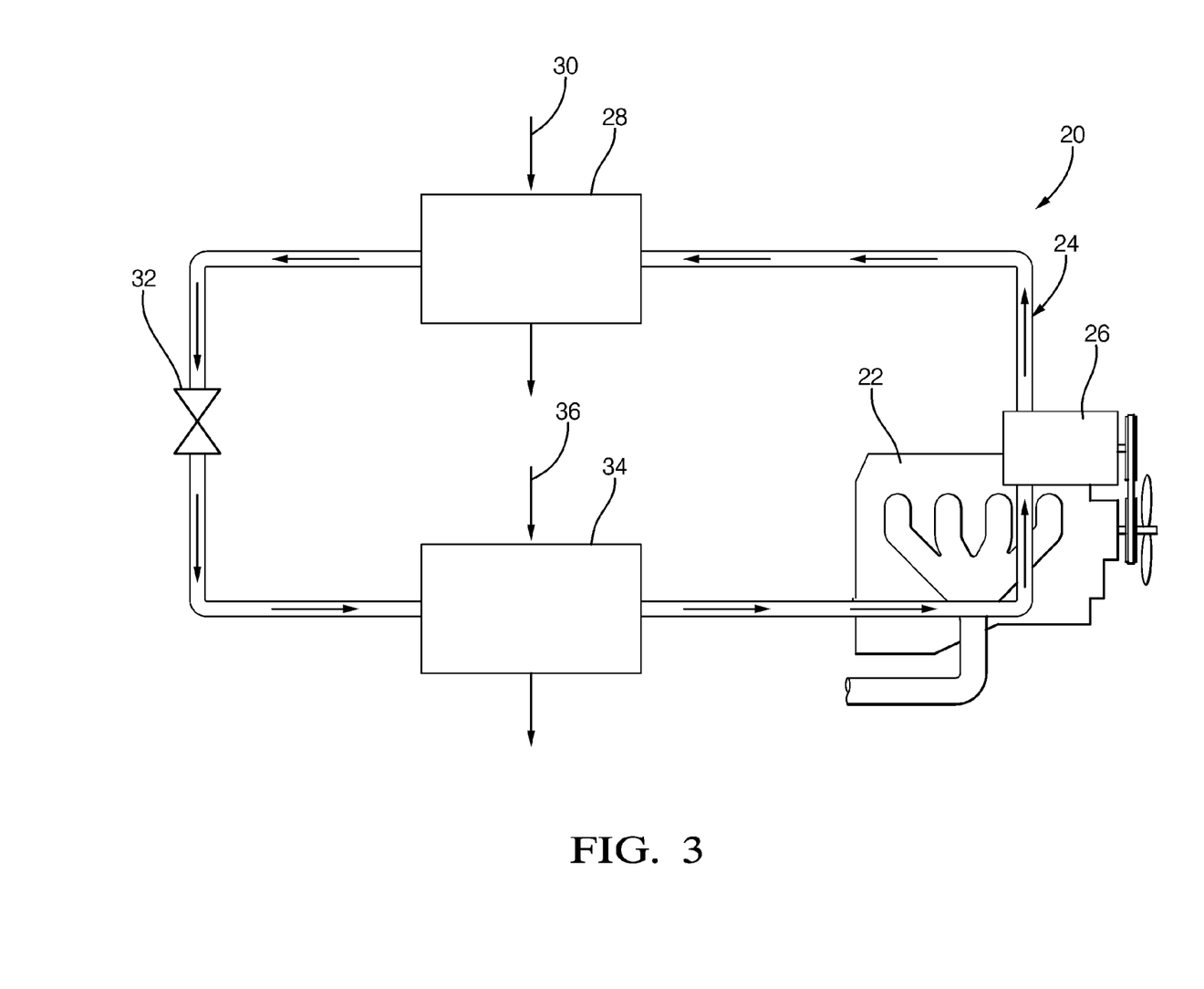
FIG. 3 is a flow-chart of the exemplary embodiment of the air conditioning system.

Referring to the Figures, wherein like numerals indicate corresponding parts throughout the several views, an air conditioning system 20 is generally shown in FIG. 3. In the exemplary embodiment, the air conditioning system 20 is shown in a vehicle having an engine 22, but the air conditioning system 20 could also be used to cool a building or any other structure. The vehicle of the exemplary embodiment has a first operating mode with the engine 22 of the vehicle running and a second operating mode with the engine 22 of the vehicle dormant. The second operating mode could be a number of different driving conditions, e.g. when the vehicle is coasting or temporarily stopped. The air conditioning system 20 is particularly effective when used in a hybrid-electric vehicle because the air conditioning system 20 of the exemplary embodiment continues to provide cooling for the cabin of the vehicle when the electric motor is driving the vehicle.

The air conditioning system 20 includes a refrigerant loop 24, generally indicated in FIG. 3, for cycling a refrigerant. The refrigerant loop 24 includes a compressor 26 for compressing the refrigerant to a superheated gas in the first operating mode. In the exemplary embodiment, the compressor 26 is operably connected to the engine 22 of the vehicle. In other words, the compressor 26 functions only when the engine 22 of the vehicle is running. Alternately, the compressor 26 could be electrically driven, e.g. when the air conditioning system 20 is used to cool a building, or for an electric vehicle without an engine 22.

The refrigerant loop 24 further includes a condenser 28 in fluid communication with the compressor 26 for receiving the superheated refrigerant and for transferring heat from the refrigerant to a first flow of air 30 to condense the refrigerant to a liquid. The refrigerant loop 24 further includes an expansion valve 32 in fluid communication with the condenser 28 for receiving the liquid refrigerant and for subcooling the refrigerant.

An evaporator 34 completes the refrigerant loop 24 and is in fluid communication with the expansion valve 32 for receiving the subcooled refrigerant. The evaporator 34 transfers heat from a second flow of air 36 to the refrigerant to evaporate the refrigerant to a gas and to cool the second flow of air 36. In the exemplary embodiment, the second flow of air 36 is for cooling the cabin of the vehicle in the first operating mode with the engine 22 of the vehicle running, but as explained above, the second flow of air 36 could also be for cooling a building.

Figure 1:
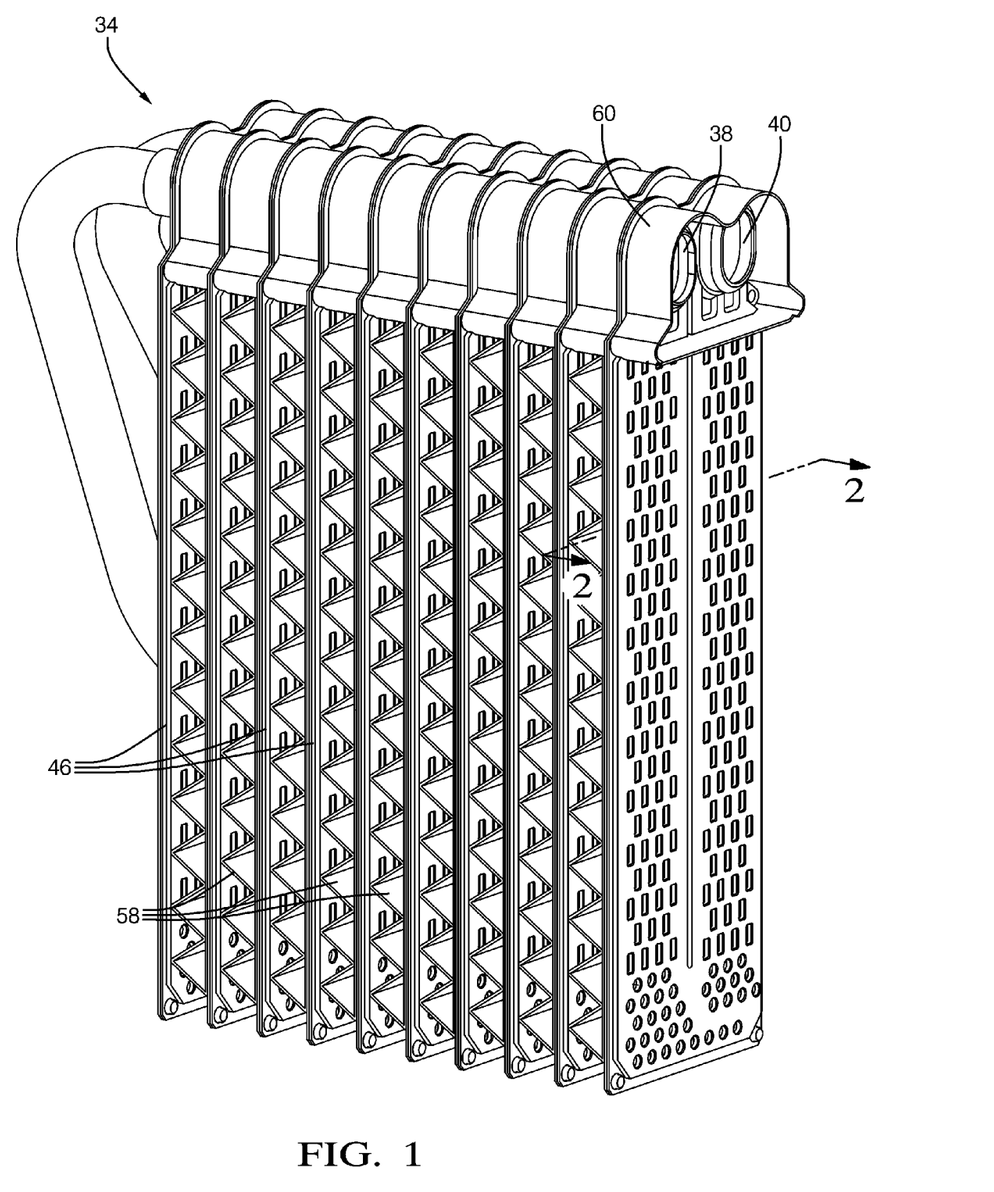
FIG. 1 is a perspective view of the exemplary embodiment of the evaporator.
Figure 2:
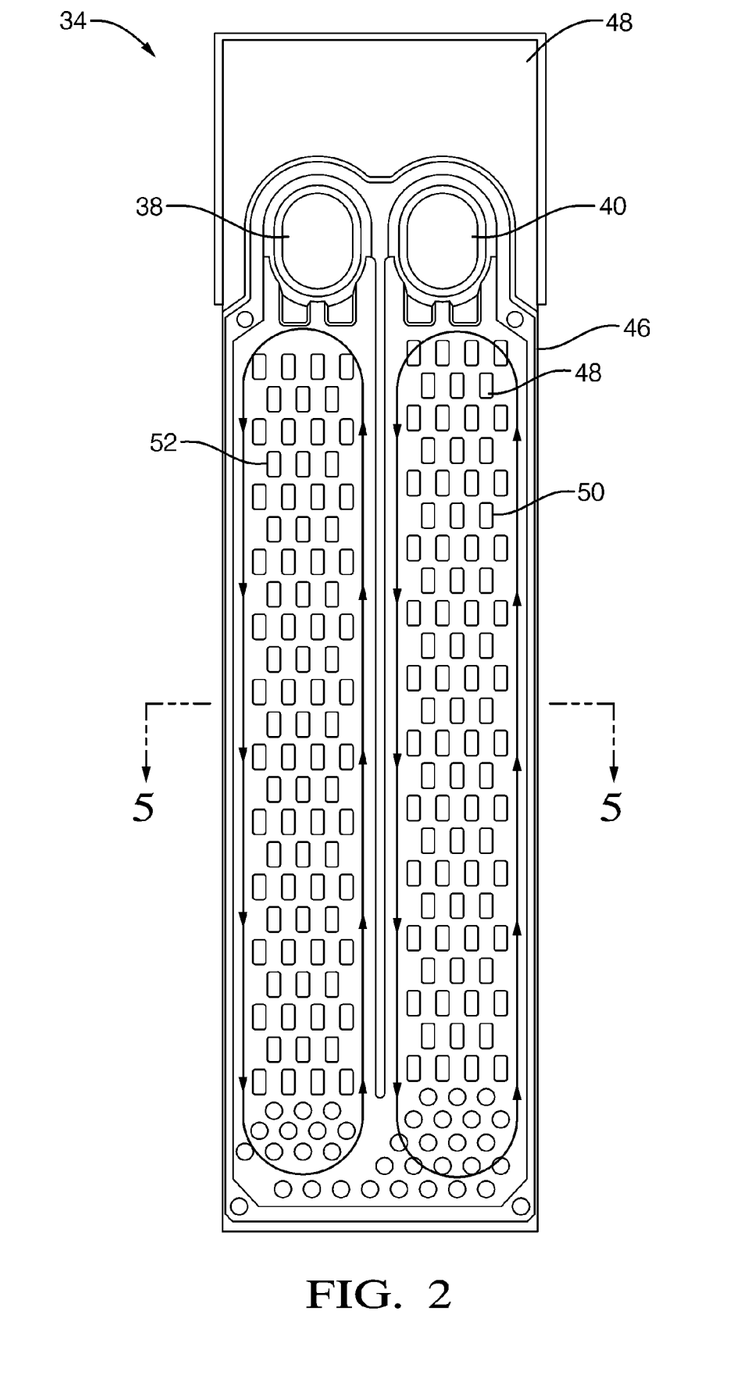
FIG. 2 is a cross-sectional view of the exemplary embodiment of the evaporator taken along line 2-2 of FIG. 1.
Figure 4:
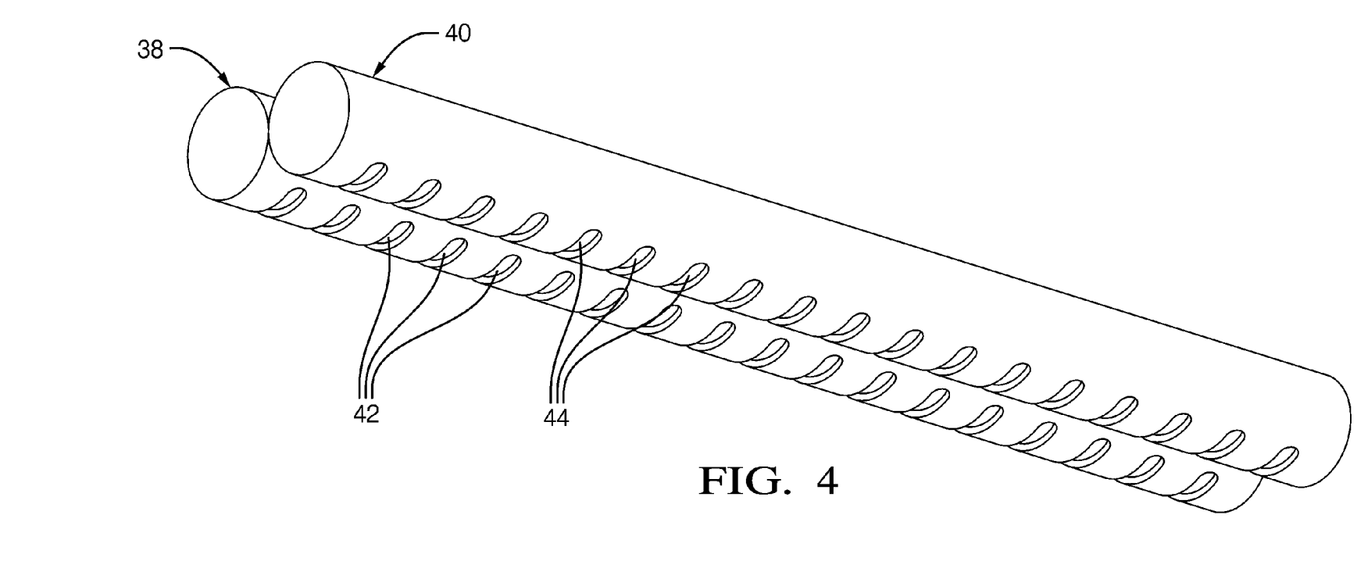
FIG. 4 is a perspective view of the exemplary embodiment of the input and output manifolds.
Figure 5:
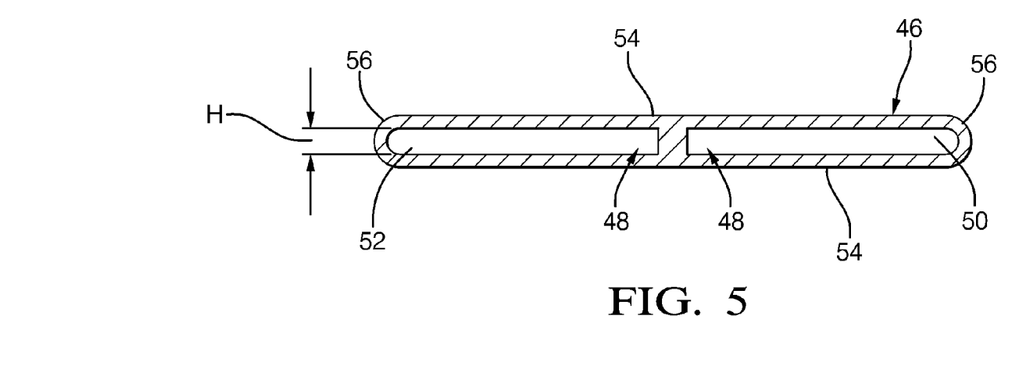
FIG. 5 is a cross-sectional view of one of the tubes taken along Line 5-5 of FIG. 2.

The evaporator 34 of the exemplary embodiment, generally shown in FIGS. 1 and 2, includes an input manifold 38 and an output manifold 40 extending in spaced and parallel relationship in a horizontal direction, best shown in FIGS. 1, 2 and 4. The input manifold 38 defines a plurality of input tube slots 42 horizontally spaced from one another, and the output manifold 40 defines a plurality of output tube slots 44 horizontally spaced from one another and aligned the input tube slots 42. The evaporator 34 further includes a plurality of tubes 46. In the exemplary embodiment with the air conditioning system 20 being in a vehicle, the tubes are preferably of aluminum. Where the air conditioning system 20 is used for cooling a building, the tubes are preferably of copper. Each of the tubes 46 defines a fluid passage 48 extending between the aligned input and output tube slots 42, 44 for conveying the refrigerant from the input manifold 38 to the output manifold 40. Each of the fluid passages 48 defines a first leg 50 in fluid communication with one of the input tube slots 42 and a second leg 52 in fluid communication with the aligned output tube slot 44. The first and second legs 50, 52 of the fluid passage 48 extend downward in parallel relationship with one another away from the input and output manifolds 38, 40. The first and second legs 50, 52 the fluid passage 48 are interconnected vertically below the input and output manifolds 38, 40 to define a U-shape for the fluid passage 48. As best shown in FIG. 5, each of the tubes 46 has a cross-section presenting flat sides 54 interconnected by round ends 56. Each of the first and second legs 50, 52 of the fluid passage 48 has a height H of at least 0.8 mm.

An air fin 58 is disposed between and engages the flat sides 54 of adjacent tubes 46 for receiving heat from the second flow of air 36. In the exemplary embodiment, the air fins 58 are brazed to the flat sides 54 of the adjacent ones of the tubes 46. The air fins 58 of the exemplary embodiment are also corrugated to increase heat transfer from the refrigerant in the evaporator 34 to the second flow of air 36.

The evaporator 34 defines at least one PCM tank 60 for storing a phase change material. The phase change material may be that of a liquid saturated hydrocarbon having a molecular formula of $C_nH_{2n+2}$, a paraffin wax, or any other material that may remain in a liquid phase at room temperature. When operating in the first operating mode heat is transferred from the phase change material to the sub-cooled refrigerant to cool and freeze the phase change material.

In the exemplary embodiment, the PCM tank 60 engages the input and output manifolds 38, 40. In the second operating mode, heat is transferred from the refrigerant to the frozen phase change material to cool and condense the refrigerant. The condensed refrigerant in the input and output manifolds 38, 40 increases in density and falls downwardly in the vertical direction through the first and second legs 50, 52 of the fluid passages 48 of the tubes 46, due to gravity. The condensed refrigerant then receives heat from the second flow of air 36 to cool the second flow of air 36 and evaporate the refrigerant. The evaporated refrigerant flows upwardly in the vertical direction through the first and second legs 50, 52 of the fluid passages 48 of the tubes 46 and back to the low pressure of the cool input and output manifolds 38, 40 where it is subsequently re-cooled and condensed by transferring heat to the frozen phase change material. In other words, in the exemplary embodiment, the evaporator 34 continues to cool the second flow of air 36, even when the vehicle is in the second operating mode with the engine 22 of the vehicle dormant.

Figure 6:
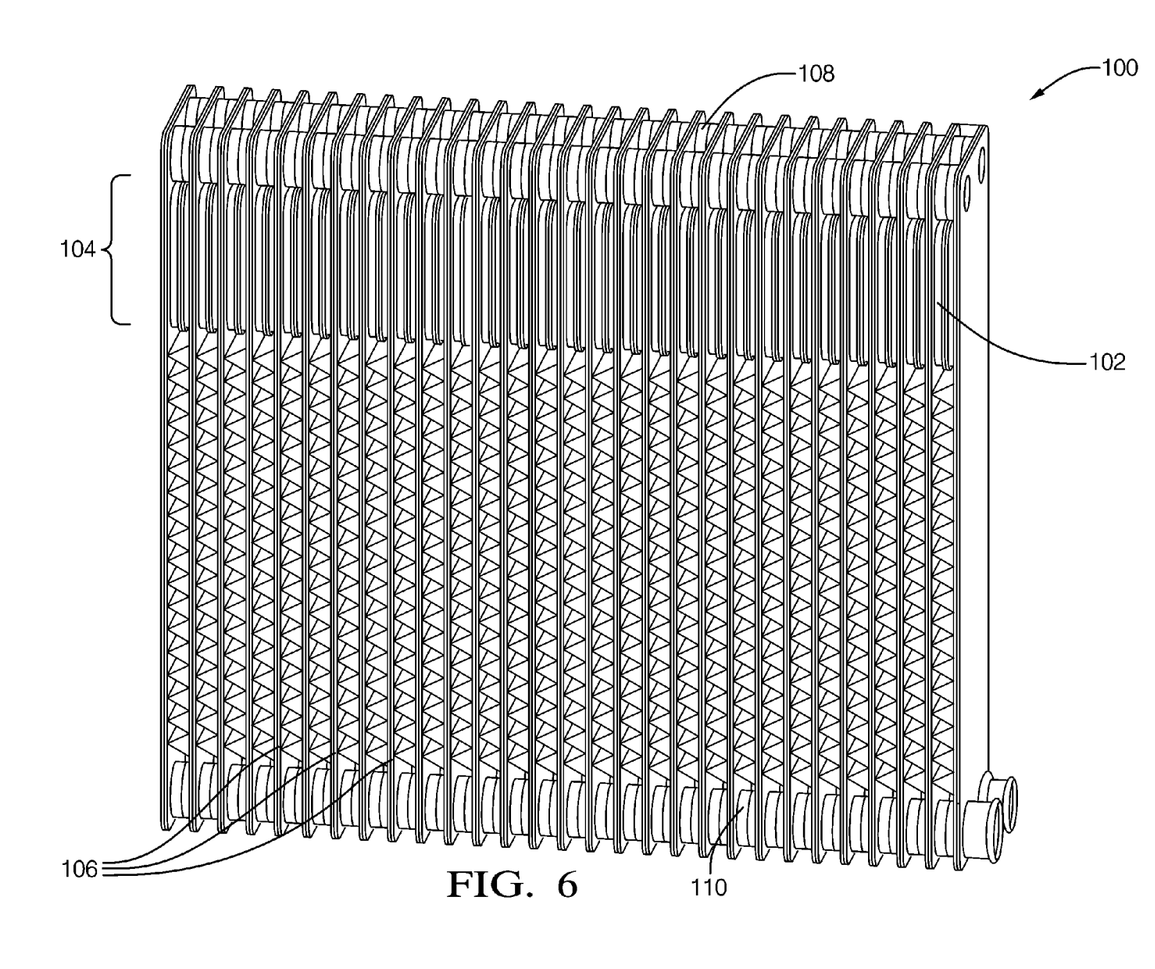
FIG. 6 is a perspective view of an alternative embodiment of an evaporator having a plurality of PCM housings sandwiched between adjacent refrigerant tubes.

Shown in FIG. 6 is an alternative exemplary embodiment of an evaporator 100 having a plurality of PCM housings 102 in thermal communication with the upper region 104 of the refrigerant tubes 106. The evaporator 100 includes an upper manifold 108 and a lower manifold 110, in which the terms upper and lower are used with respect to the direction of gravity. Hydraulically connecting the upper manifold 108 with the lower manifold 110 are flat refrigerant tubes 106 which may be manufactured by any methods known to those of ordinary skill in the art, such as by extrusion, folding of a sheet of heat conductive material, or assembling two half plates having stamped features defining flow spaces. While flat tubes are shown, those of ordinary skill in the art would recognize that other refrigerant tube shapes may be utilized.

Figure 7:
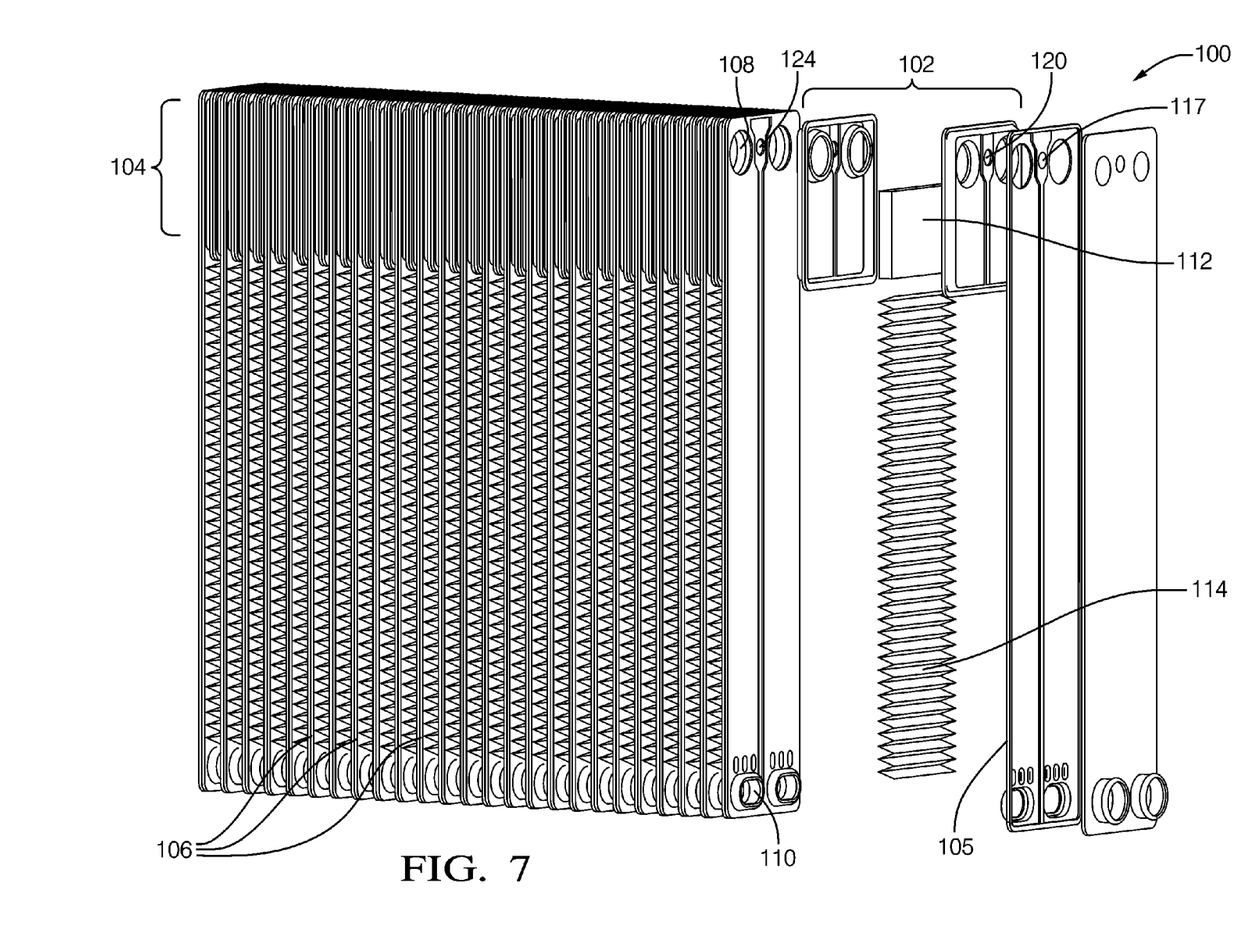
FIG. 7 is a perspective exploded view of the evaporator shown in FIG. 6.

Shown in FIG. 7 is a partially exploded view of the evaporator 100, which is manufactured from a plurality stamped metallic plates 105. The stamped metallic plates 105 include features known to those of ordinary skill in the art, such as openings, bosses about selected openings, and flanges. When stacked and brazed, the plurality of stamped metallic plates 105 define the upper manifold 108, lower manifold 110, and flat refrigerant tubes 106 hydraulically connecting the manifolds 108, 110. Inserted between adjacent flat refrigerant tubes 106 is a PCM housing 102 containing a phase change material. The PCM housing 102 may be defined by features on the stacked and brazed stamped metallic plates 105, or may be manufactured separately and then assembled onto the evaporator 100. A PCM housing 102 is disposed between adjacent flat refrigerant tubes 106 and is in thermal contact with only the upper region 104 of the flat refrigerant tubes 106. The PCM housing 102 may surround part of the upper manifold 108 or, as an alternative, the PCM housing 102 may be separate from the upper manifold 108 and positioned in the upper region 104 of the flat refrigerant tubes 106 immediately below the upper manifold 108. A heat conductive material such as metallic fins 112 or metallic particles or fibers may be added in the PCM housing 102 to increase the heat transfer efficiency. Corrugated fins 114 may be inserted between the adjacent flat refrigerant tubes 106 beneath the PCM housing 102.

Figure 8:
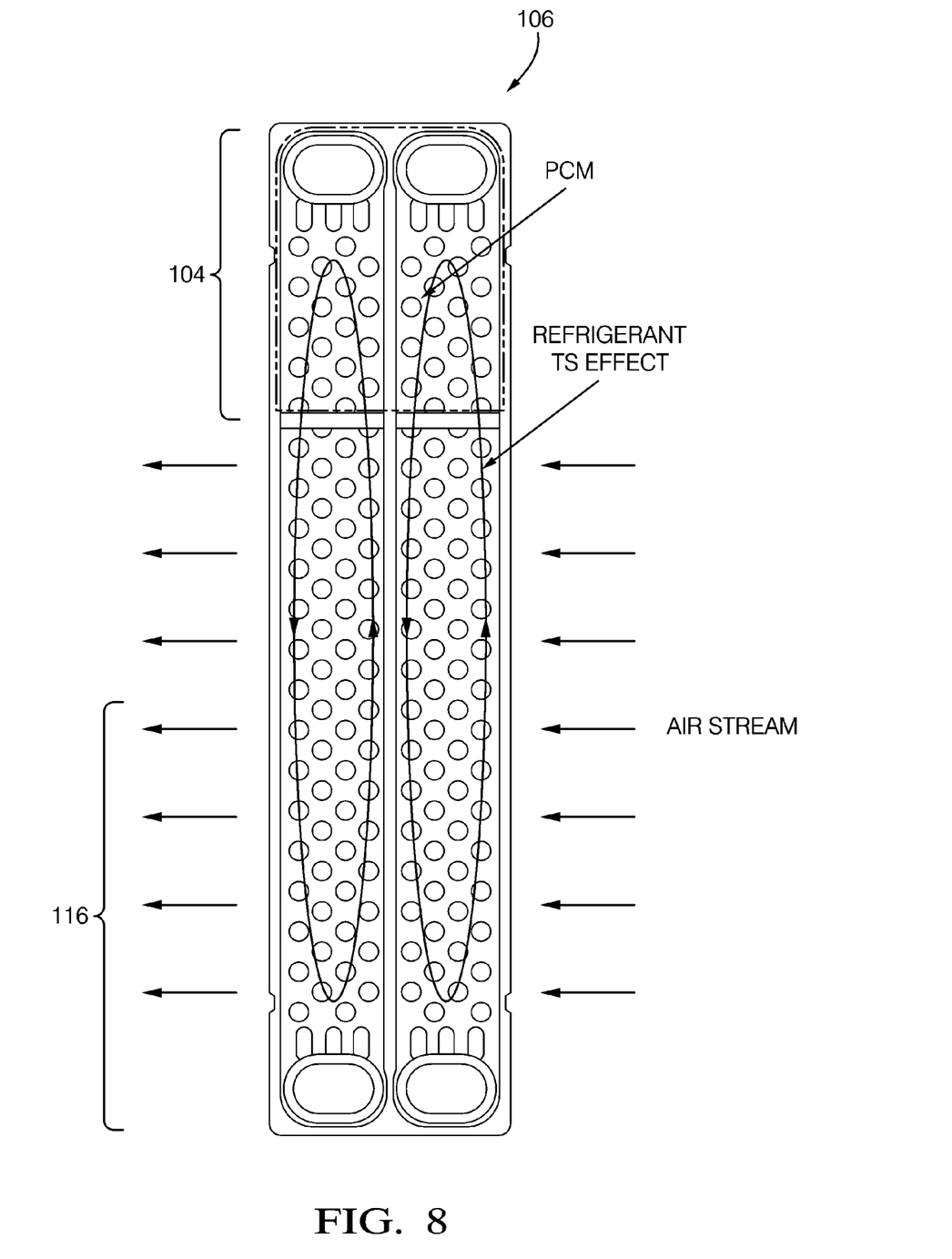
FIG. 8 shows a schematic diagram of the thermal siphon effect through a refrigerant tube of the evaporator shown in FIG. 6.

Referring to FIG. 8, as disclosed herein above, in the second operating mode with the engine 22 of the vehicle dormant, heat is transferred from the higher temperature vapor refrigerant to the lower temperature frozen phase change material in the upper region 104 of the flat refrigerant tubes, thereby cooling and condensing the refrigerant into a liquid phase. As the higher density condensed liquid phase refrigerant settles toward the lower portion 116 of the flat refrigerant tubes 106, the refrigerant absorbs heat from the on-coming air stream and expands into a vapor phase. The lower density vapor refrigerant flows upwardly back toward the lower temperature phase change material where the vapor refrigerant is subsequently re-cooled and re-condensed to repeat the thermal siphon cycle. In other words, by positioning the phase change material to be in thermal contact with only the upper region 104 of the flat refrigerant tubes 106, the lower temperature phase change material induces a thermal siphon within the flat refrigerant tubes 106 that allows the refrigerant to continue to cool the on-coming air stream while the compressor of the air conditioning system is not operating for short periods of time.

Figure 9:
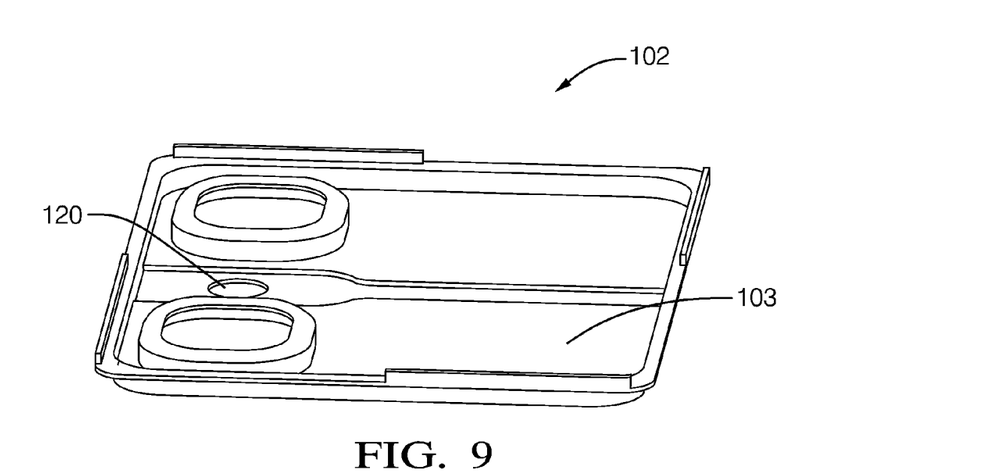
FIG. 9 shows a plate of the PCM housing.

Referring to FIG. 9, the PCM housing 102 may be formed of two half plates 103 that include complementary features that allow the PCM housing 102 to be assembled like that of two halves of a clam shell. The two half plates 103 may include bosses and apertures that cooperate with bosses and apertures of the metallic plates that form the flat tubes to define the upper manifolds 108. The two half plates 103 may also include PCM ports 120 that cooperate with through-holes 117 in the flat refrigerant tubes 106 to define a PCM passageway 124 for hydraulic communication of the phase change material between the PCM housings 102. The PCM passageway 124 allows for the ease of filling the PCM housings 102 with the phase change material during manufacturing and also allows for the phase change material to migrate from one PCM housing 102 to another to account for unequal expansion of the phase change material in the PCM housings 102 due to thermal gradient across the evaporator 100.

Figure 10:
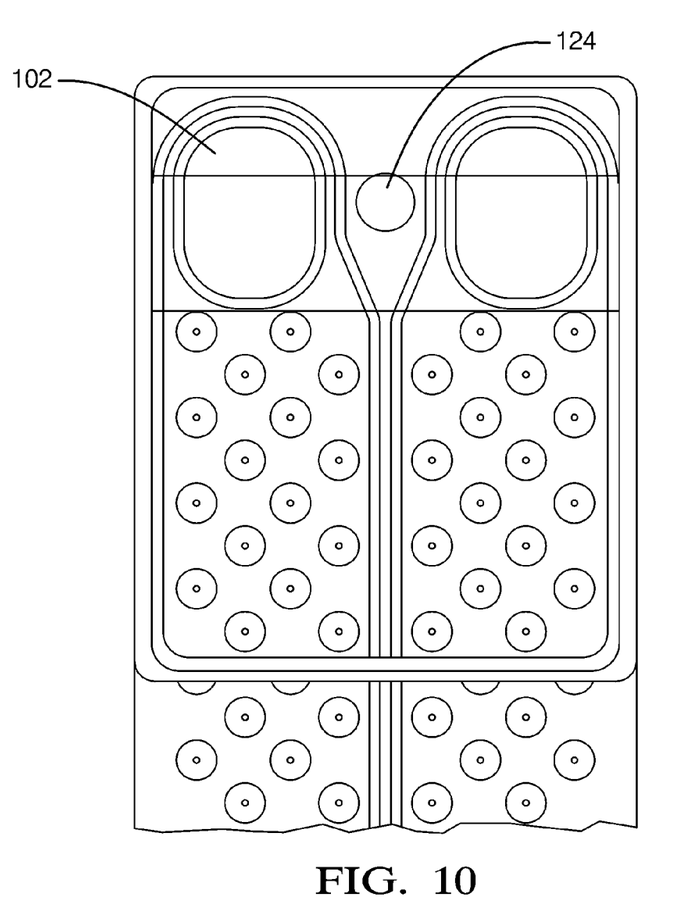
FIG. 10 shows a cross-section of a PCM housing engaged to an upper portion of a refrigerant tube.

Referring to FIG. 10, by positioning the phase change material below the upper manifolds 108 allow greater thermal conductivity between the phase change material and refrigerant. The length of the PCM housing 102 may be adjusted to provide the desired volume of phase change material required to achieve the desire cooling performance while the engine of the vehicle is dormant. It is preferable to fill less than the full capacity of the PCM housing with the phase change material to account for the volumetric expansion of the material at elevated temperatures up to 200° F. The position of the PCM port 120 is positioned with respect to the PCM housing 102 to allow the phase change material to migrate between the PCM housings. If the PCM port 120 is too high, the phase change material cannot redistribute and equalization of the PCM housing volume between spaces will not occur. A uniform distribution of phase change material will minimize cost and ensure optimum operation. If a PCM housing 102 has excess phase change material, it will result in additional cost; too little phase change material, it will result in poor performance in that portion of the evaporator 100.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An evaporator for an air conditioning system, comprising:
    a first manifold;
    a second manifold spaced from and substantially parallel with said first manifold;
    a plurality of refrigerant tubes hydraulically connecting said first and second manifolds for a refrigerant flow therebetween, wherein said plurality of refrigerant tubes includes an upper region and a lower region with respect to gravity; and
    a first PCM housing configured to contain a phase change material such that the phase change material is in thermal contact with only the upper region of said plurality of refrigerant tubes.

2. The evaporator for an air conditioning system of claim 1, further comprising a second PCM housing configured to contain a phase change material such that the phase change material is in thermal contact with only the upper region of said plurality of refrigerant tubes.

3. The evaporator for an air conditioning system of claim 2, wherein said first PCM housing is in hydraulic communication with said second PCM housing for hydraulic communication of phase change material therebetween.

4. The evaporator for an air conditioning system of claim 3, wherein said at least one of refrigerant tubes includes two opposing flat surfaces, and wherein each of said PCM housings is in thermal contact with said opposing flat surfaces, respectively.

5. The evaporator for an air conditioning system of claim 4, 
    wherein said at least one of refrigerant tubes is a flat refrigerant tube having a through-hole between said opposing flat surfaces,
    wherein said first and second PCM housings include a PCM port,
    wherein said through-hole of said at least one of flat refrigerant tubes cooperation with said PCM ports of said PCM housings to define a PCM passageway hydraulically interconnecting said PCM housings.

6. The evaporator for an air conditioning system of claim 5, wherein said PCM housing contains a heat conductive material.

7. The evaporator for an air conditioning system of claim 6, wherein said heat conductive material includes metallic fins.

8. The evaporator for an air conditioning system of claim 6, wherein said heat conductive material includes metallic particles or fibers.

9. The evaporator for an air conditioning system of claim 8, wherein said second manifold is spaced beneath said first manifold with respect to the direction of gravity.

10. The evaporator for an air conditioning system of claim 9, wherein said upper region of said plurality of refrigerant tubes is adjacent to said first manifold and said lower region of said plurality of refrigerant tubes is adjacent to said second manifold.

11. An evaporator for an air conditioning system, comprising,
    an upper manifold extending in a direction;
    at least one refrigerant tube for refrigerant flow in fluid communication with said manifold, wherein said refrigerant tube includes an upper region adjacent to said upper manifold; and
    a PCM housing for storing a phase change material such that said phase change material is in thermal communication with said upper region of said refrigerant tube, wherein said PCM housing includes a first stamped plate and a second stamped plate, wherein said stamped plates have complementary features such that the plates cooperates with each other when assembled to define a chamber to contain a phase change material and at least one PCM port.

12. The evaporator for an air conditioning system of claim 11, wherein said at least one refrigerant tube is a flat tube having a first surface and an opposing second surface and a through-hole therebetween, wherein said PCM housing is engaged to said first surface and a second PCM housing is engaged to said second surface, such that the PCM ports of each PCM housings cooperates with said through-hole to define a PCM passageway for hydraulic communication between said PCM housings.

13. An evaporator for an air conditioning system, comprising:
   an upper manifold;
   a lower manifold spaced from and substantially parallel with said upper manifold;
   a plurality of refrigerant tubes hydraulically connecting said upper and lower manifolds for hydraulic communication of a two phase refrigerant therebetween said manifolds; and
   a PCM housing configured to contain a phase change material, wherein said phase change material is in thermal contact with at least one of said plurality of refrigerant tubes such that when the temperature of the phase change material is lower than the temperature of the refrigerant in said refrigerant tube, the temperature differential between the temperature of the phase change material and the temperature of the refrigerant in said refrigerant tube induces a thermal siphon of the refrigerant within said refrigerant tube.

\* \* \* \* \*